US010679631B2

(12) United States Patent
Hirzel et al.

(10) Patent No.: US 10,679,631 B2
(45) Date of Patent: Jun. 9, 2020

(54) GENERATING CHAT BOTS FROM WEB API SPECIFICATIONS

(71) Applicant: International Business Machines Corporation, Armonk, NY (US)

(72) Inventors: Martin Hirzel, Ossining, NY (US); Louis Mandel, New York, NY (US); Avraham E. Shinnar, Westchester, NY (US); Jerome Simeon, New York, NY (US); Mandana Vaziri, White Plains, NY (US); Charles Wiecha, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/433,564

(22) Filed: Jun. 6, 2019

(65) Prior Publication Data
US 2019/0287537 A1 Sep. 19, 2019

Related U.S. Application Data

(63) Continuation of application No. 15/692,410, filed on Aug. 31, 2017, now Pat. No. 10,388,285.

(51) Int. Cl.
*G10L 17/22* (2013.01)
*G10L 15/22* (2006.01)
(Continued)

(52) U.S. Cl.
CPC ............. *G10L 17/22* (2013.01); *G06F 8/30* (2013.01); *G06F 8/35* (2013.01); *G06N 3/006* (2013.01);
(Continued)

(58) Field of Classification Search
CPC . G10L 15/22; G10L 15/1815; G10L 15/1822; G10L 15/26; G10L 15/18;
(Continued)

(56) References Cited

U.S. PATENT DOCUMENTS 7,027,975 B1 * 4/2006 Pazandak ............ G06F 16/3344
704/9
8,001,469 B2 8/2011 Weng et al.
(Continued)

FOREIGN PATENT DOCUMENTS

WO 2011/088053 A2 7/2011
WO 2013/155619 A1 10/2013

OTHER PUBLICATIONS

Androutsopoulos, I, et al., "Natural Language Interfaces to Databases—An Introduction", https://arxiv.org/pdf/cmp-lg/9503016.pdf, Mar. 16, 1995, Printed on Aug. 29, 2017, 50 pages.
(Continued)

*Primary Examiner* — Jonathan Han
(74) *Attorney, Agent, or Firm* — Scully, Scott, Murphy & Presser, P.C.; Anthony R. Curro

(57) ABSTRACT

Automatic generation of a chat bot from an API specification to carry out a dialogue with a user and invoke an API call described in the API specification. Based on input API specification, a conversational bot specification representing a dialog flow is constructed. A natural language expression is received and transformed into instructions based on the conversational bot specification. Based on the instructions, a natural language prompt to the user and executable computer code for invoking the API call may be generated.

19 Claims, 9 Drawing Sheets

(51) Int. Cl.
*G06F 8/30* (2018.01)
*G06F 8/35* (2018.01)
*G06N 3/00* (2006.01)
G06F 16/9032 (2019.01)
G06F 16/2452 (2019.01)
G06N 3/04 (2006.01)
H04L 12/58 (2006.01)
G06N 20/00 (2019.01)
G06N 5/02 (2006.01)
G06F 40/20 (2020.01)

(52) U.S. Cl.
CPC ........ *G10L 15/22* (2013.01); *G06F 16/24522* (2019.01); *G06F 16/90332* (2019.01); *G06F 40/20* (2020.01); *G06N 3/0427* (2013.01); *G06N 5/022* (2013.01); *G06N 20/00* (2019.01); *H04L 51/02* (2013.01); *H04L 51/046* (2013.01)

(58) Field of Classification Search
CPC ... G10L 15/08; G10L 15/24; G06F 17/30654; G06F 17/30401; G06F 17/30684; G06F 17/30976
USPC ............................................ 704/9, 251, 257
See application file for complete search history.

(56) References Cited

U.S. PATENT DOCUMENTS

| | | | |
|---|---|---|---|
| 8,346,563 B1* | 1/2013 | Hjelm ................. | G10L 15/1822 379/88.01 |
| 8,719,200 B2 | 5/2014 | Beilby et al. | |
| 9,043,407 B1 | 5/2015 | Gaulke et al. | |
| 9,369,410 B2 | 6/2016 | Capper et al. | |
| 9,472,185 B1* | 10/2016 | Yeracaris ............. | G10L 15/063 |
| 2009/0007011 A1 | 1/2009 | Czerwinski et al. | |
| 2009/0070113 A1 | 3/2009 | Gupta et al. | |
| 2010/0005081 A1* | 1/2010 | Bennett ................ | G06F 17/27 704/9 |
| 2014/0034395 A1 | 2/2014 | Eggers et al. | |
| 2014/0343950 A1 | 11/2014 | Simpson et al. | |
| 2015/0014270 A1 | 1/2015 | Biesecker et al. | |
| 2015/0142704 A1* | 5/2015 | London ............ | G06F 16/90332 706/11 |
| 2016/0343378 A1 | 11/2016 | Chen et al. | |
| 2017/0116982 A1 | 4/2017 | Gelfenbeyn et al. | |

OTHER PUBLICATIONS

Borrow, D.G., et al., "GUS, A Frame-Driven Dialog System", Artificial Intelligence, Apr. 1977, pp. 155-173, vol. 8, Issue 2.
Clark, H.H., et al., "Grounding in Communication", American Psychological Association, from Perspectives on Socially Shared Cognition, 1991, http://www.cs.cmu.edu/~illah/CLASSDOCS/Clark91.pdf, Printed on Aug. 29, 2017, pp. 222-233.
Gulwani, S., et al., "NLyze: Interactive Programming by Natural Language for SpreadSheet Data Analysis and Manipulation", SIGMOD'14, Jun. 22-27, 2014, 12 pages.
Hermans, F., et al., "Enron's Spreadsheets and Related Emails: A Dataset and Analysis", Delft University of Technology Software Engineering Research Group Technical Report Series, Report TUD-SERG-2014-021, https://repository.tudelft.nl/islandora/object/uuid:085374fa-06a3-48c9-a0022-aa02c32507e8/datastream/OBJ, Printed on Aug. 29, 2017, 14 pages.
IBM, "Watson Language Translator Service", https://www.ibm.com/watson/developercloud/language-translator.html, Printed on Aug. 29, 2017, 8 pages.
IBM, "Watson Conversation Service" https://www.ibm.com/watson/developercloud/conversation.html, Printed on Aug. 29, 2017, 7 pages.
IFTTT (If This Then That), "Learn how IFTTT works", https://ifttt.com/, Printed on Aug. 29, 2017, 1 page.
Kaplan, R., "Beyond the GUI: It's Time for a Conversational User Interface", WIRED, https://www.wired.com/2013/03/conversational-user-interface/, Mar. 21, 2013, Printed on Aug. 29, 2017, 6 pages.
Kate, R.J., et al., "Learning to Transform Natural to Formal Languages", American Association for Artificial Intelligence, 2005, http://www.aaai.org/Papers/AAAI/2005/AAAI05-168.pdf, Printed on Aug. 29, 2017, pp. 1062-1068.
Kuhn, T., "A Survey and Classification of Controlled Natural Languages", Submission, Computational Linguistics, Mar. 2014, pp, 121-170, vol. 40, No. 1.
Lucas, B., "VoiceXML for Web-based Distributed Conversational Applications", Communications of the ACM, Sep. 2000, pp. 53-57, vol. 43, No. 9.
Lyons, G., et al., "Making the Case for Query-by-Voice with EchoQuery", SIGMOD'16, Jun. 26-Jul. 1, 2016, pp. 2129-2132.
McCarthy, J., "History of LISP", ACM SIGPLAN Notices, Aug. 1978, pp. 217-223, vol. 13, No. 8.
McTear, M.F., "Spoken Dialogue Technology: Enabling the Conversational User Interface", ACM Computing Surveys, pp. 90-169, Mar. 2002, vol. 34, No. 1.
Ralphson, M., et al.,"OpenAPI Specification", https://github.com/OAI/OpenAPI-Specification/blob/master/versions/2.0.md, Apr. 4, 2017, Printed on Aug. 29, 2017, 41 pages.
Rodriguez, C., et al., "REST APIs: A Large-Scale Analysis of Compliance with Principles and Best Practices", http://www.carlosrodriguez.info/papers/rest-icwe2016.pdf, Printed on Aug. 29, 2017, 18 pages.
Sajaniemi, J., et al., "An empirical analysis of spreadsheet calculation", http://onlinelibrary.wiley.com/doi/10.1002/spe.4380180607/full, Jun. 1988, Printed on Aug. 29, 2017, 1 page (Abstract only), vol. 18, Issue 6.
Slack, "Where Work Happens", https://slack.com/, Printed on Aug. 29, 2017, 2 pages.
Williams, J.D., et al., "Rapidly scaling dialog systems with interactive learning", https://pdfs.semanticscholar.org/095f/f951f0ac801310f10208adb838204d4b17bb.pdf, Printed on Aug. 29, 2017, 12 pages.
List of IBM Patents or Patent Applications Treated as Related, dated Jun. 6, 2019, 2 pages.
International Search Report dated Dec. 5, 2018, issued in PCT/EP2018/071727, 18 pages.

* cited by examiner

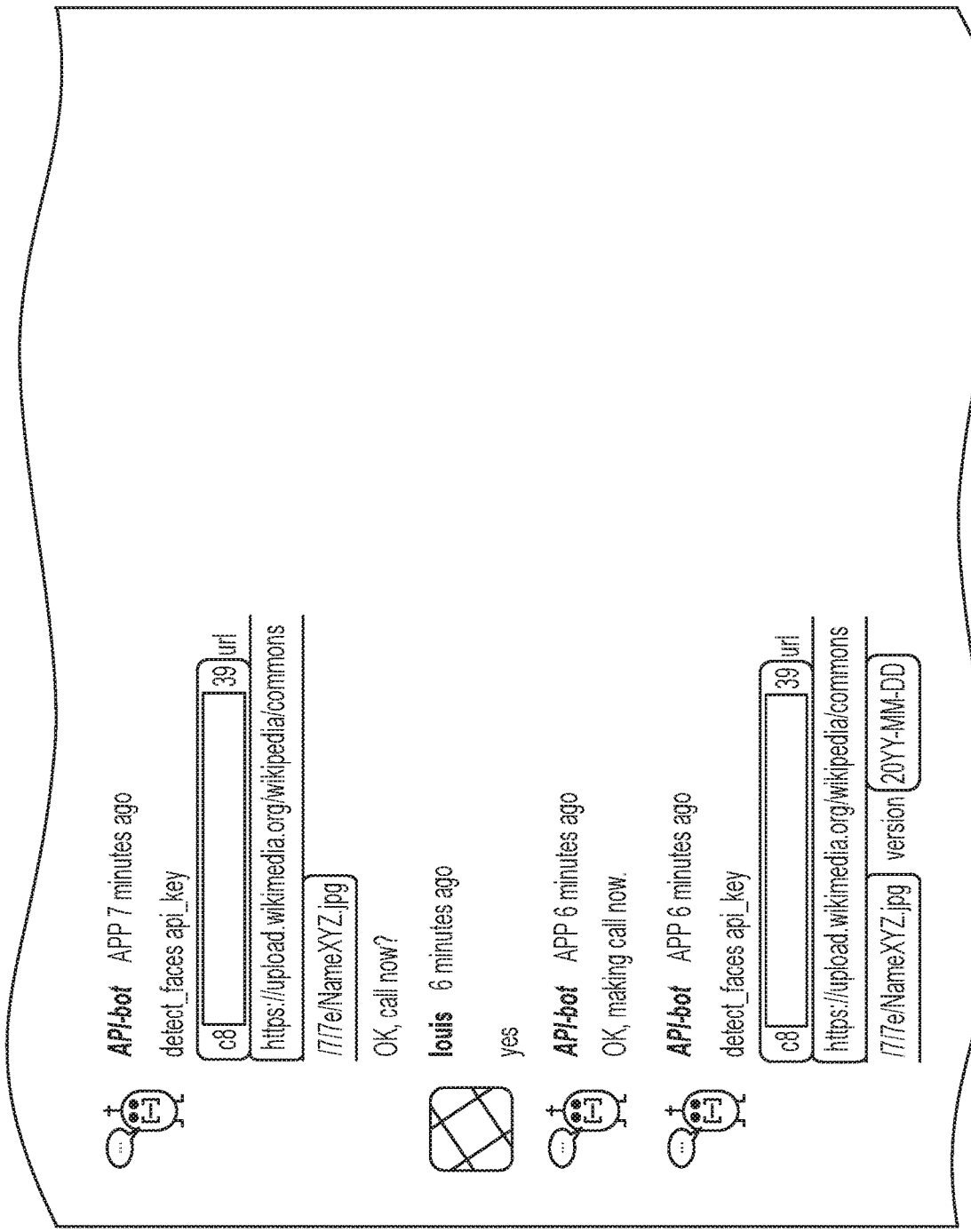

```
"images": [
    {
        "faces": [
            {
                "age": {
                    "min": 65,
                    "score": 0.670626
                },
                "face_location": {
                    "height": 910,
                    "left": 208,
                    "top": 379,
                    "width": 1223
                },
                "gender": {
                    "gender": "MALE",
                    "score": 0.997527
                },
                "identity": {
                    "name": "NameXYZ",
                    "score": 0.952574,
                    "type_hierarchy": "/people/namexyz"
                }
            }
        ],
```

FIG. 4D

GENERATING CHAT BOTS FROM WEB API SPECIFICATIONS

FIELD

The present application relates generally to computers and computer applications, and more particularly to chat bots or robots, natural language processing, and generating of chat bots.

BACKGROUND

Chat bots, or conversational agents, communicate with users via natural-language dialogue and may operate through a web page, a phone, or a messaging system. For example, they are programmed to answer commonly asked question, help navigate a web page more effectively, or fill out online forms. Companies are increasingly relying on chat bots to offer support and services to users, for example, their customers and employees.

Like graphical applications, chat bots may accomplish their work by calling web Application Programming Interfaces (APIs). These APIs offer users access to the resources stored in a company's databases and the actions implemented in the company's systems. An approach for providing web APIs is REST (REpresentational State Transfer). In REST, the service provider hosts resources, and the service provider and consumer interact by transferring representations (typically JSON: JavaScript Object Notation) of the state of the resources.

Chat bots are difficult to build and it takes time to get them right. Unlike other software, chat bots depend upon NLU (natural language understanding), which may not be perfect. Since it is hard to anticipate what the common NLU mistakes will be, it pays to deploy an initial bot quickly and gather experience with it in the field to improve it. Chat bot development is further complicated by requiring both software development and machine learning skills. Also, since companies have only recently started to broadly embrace chat bots, there is a lack of programming models for non-experts to develop chat bots.

BRIEF SUMMARY

A method and system of automatically generating a conversational bot for an application programming interface (API) may be provided. The method may be executed by at least one hardware processor. The method, in one aspect, may include receiving an API specification comprising information associated with invoking an API call. The method may also include parsing the API specification. The method may further include, based on parsing the API specification, constructing a conversational bot specification. The method may also include receiving a natural language expression from a user. The method may further include, based on the conversational bot specification, transforming the natural language expression into instructions. The method may also include generating a natural language prompt based on the instructions responsive to determining that the instructions contain a prompt to present to the user. The method may further include executing a computer code to invoke the API call based on the instructions responsive to determining that the instructions contain executing the API call.

A system of automatically generating a conversational bot for an application programming interface (API), in one aspect, may include at least one hardware processor. A memory device may be coupled to the at least one hardware processor. The at least one hardware processor may be operable to receive an API specification comprising information associated with invoking an API call. The at least one hardware processor may be operable to parse the API specification. Based on parsing the API specification, the at least one hardware processor may be operable to construct a conversational bot specification, and stored on the memory device. The at least one hardware processor may be operable to receive a natural language expression from a user. Based on the conversational bot specification, the at least one hardware processor may be operable to transform the natural language expression into instructions. The at least one hardware processor may be operable to generate the natural language prompt based on the instructions responsive to determining that the instructions contain a prompt to present to the user. The at least one hardware processor may be operable to execute a computer code to invoke the API call based on the instructions responsive to determining that the instructions contain executing the API call.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 4A-4D show an example dialogue with an example visual recognition web application programming interface (API) in one embodiment.

DETAILED DESCRIPTION

A system, method and technique are presented for a compiler that takes a web API specification and automatically generates a chat bot to carry on a dialog with a user and make an API call or calls based on the dialogue, for instance, call a web API based on the dialogue and the API specification. In one embodiment, the generated bot is self-documenting, using descriptions from the API specification to answer help requests. The system, method and technique in one embodiment generate a chat bot from a web API specification.

An API specification defines a standard interface to APIs that invoke services. An example of an API specification includes a SWAGGER specification. In the below description, SWAGGER is used as an example API specification to describe an implementation of a compiler in one embodiment. However, the methodology of the present disclosure does not limit the API specification to SWAGGER only. SWAGGER is employed as a source language for generating a variety of artifacts including API documentation, client SDKs (software development kits), server stubs, and tests, but has not been previously used for generating chat bots. The methodology of the present disclosure in one embodiment may use an API specification such as Swagger as a source language for generating chat bots that enable end users to call a web API via natural-language dialogue.

Figure 1:
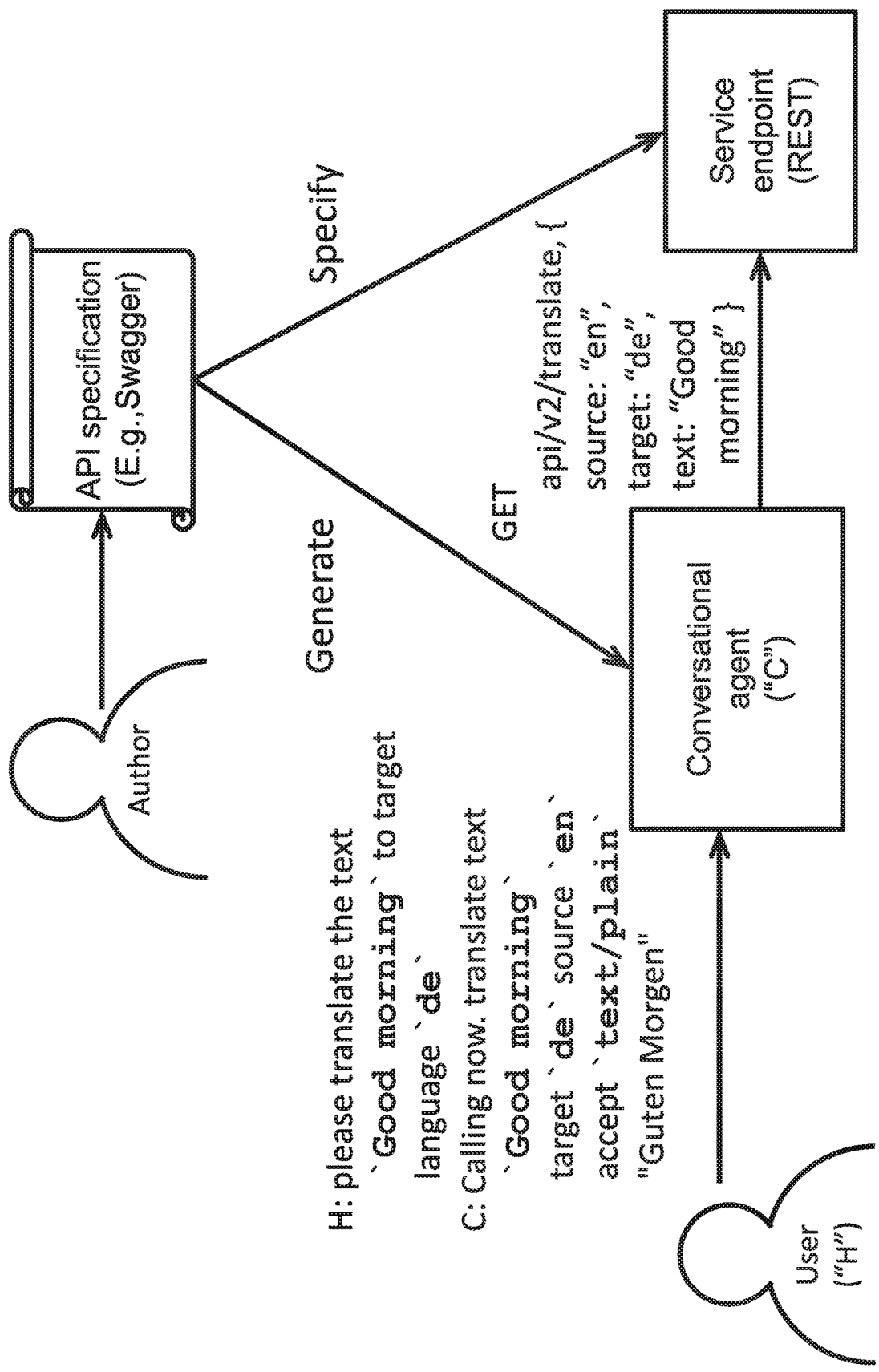
FIG. 1 shows an overall approach of a bot that includes an example in one embodiment.

FIG. 1 shows an overall approach that includes an example in one embodiment. The user ("H" for human) converses with the chat bot ("C" for conversational agent) by asking to translate a text. In this example, the user is already aware of the necessary parameters and knows to back-quote them. The chat bot fills in missing parameters via call-chaining and via defaults, then makes a REST call via the HTTP GET method to the translator service, and returns the result to the user. The generate chat bot allows end users to call web APIs without learning them first. Dialogues may use reflection to let the end user discover available actions and their parameters. The chat bot compiler in one embodiment allows developers to reuse existing API specifications to quickly boot-strap a full working bot.

In one embodiment, a chat bot compiler from web API specifications generates self-documenting chat bots for calling APIs. An implementation for the compiler and a realization in a messaging system is also presented. The compiler in one embodiment may generate a variety of chat bots based on a variety of API specifications. Programming models for both web APIs and chat bots are disclosed.

A concrete example is described below, using transcripts of dialogues with a bot generated by the compiler in one embodiment. The example is based on a Language Translator web API, which can translate between different natural languages, but also supports additional features such as identifying a language.

TABLE 1

| | Translator web API |
|---|---|
| 1 | {swagger: "2.0", |
| 2 | info: { version: "2.0.0", title: "Language Translator" }, |
| 3 | basePath: "/language-translator/api", |
| 4 | paths: { |
| 5 | */v2/identify*: { |
| 6 | get: { |
| 7 | summary: *Identifies the language of the input text*, |
| 8 | parameters: [ |
| 9 | { name: *text*, in: *query*, required: true, |
| 10 | type: *string*, |
| 11 | description: *Input text in UTF-8 format.* }, |
| 12 | { name: *accept*, in: *header*, required: false, |
| 13 | type: *string*, default: *text/plain*, |
| 14 | enum: [*application/json*, *text/plain* ], |
| 15 | description: *Format of the return values.*}], |
| 16 | responses: { |
| 17 | 200: { |
| 18 | description: *Success*, |
| 19 | schema: { $ref: *#/definitions/identifiedLanguages* }}, |
| 20 | 400: ..., 500: ... } }, |
| 21 | post: ...}, |
| 22 | */v2/translate*: ..., |
| 23 | */v2/identifiable_languages*: ..., |
| 24 | */v2/models*: ..., |
| 25 | */v2/models/{model_id}*: ... }, |
| 26 | definitions: { |
| 27 | identifiedLanguages: { |
| 28 | required: [ *languages* ], |
| 29 | properties: { |
| 30 | languages: { |
| 31 | type: *array*, description: ..., |
| 32 | items: { $ref: *#/definitions/identifiedLanguage* }}}}, |

TABLE 1-continued

| | Translator web API |
|---|---|
| 33 | identifiedLanguage: { |
| 34 | required: [ *language*, *confidence* ], |
| 35 | properties: { |
| 36 | language: { type: *string*, description: ... }, |
| 37 | confidence: { type: *number*, description: ... }}}, |
| 38 | ... }} |

The input to the bot compiler is a web API specification, for example, in Swagger. Table 1 shows the Swagger for the Translator service. The generated bot (which is referred to as API-bot as an example) uses the Swagger as guidance both for talking to the user (in natural language) and for calling the web API (in HTTP). Lines 1-3 specify the Swagger version, API version and title, and base path. Lines 4-25 specify paths relative to the base path for resources (nouns, e.g., identifiable languages) and actions (verbs, e.g., identify). For brevity, Table 1 shows details for only one of the actions, addressed by the path "/v2/identify". This path supports two operations, get and post, corresponding to the HTTP methods of the same names. Each operation has a summary, parameters, and responses, which can have both human-readable descriptions and schemas. In the example, the schemas involve references ($ref) to type definitions provided in Lines 26-38.

TABLE 2

| | Example dialogue calling the Translator web API |
|---|---|
| 1 | C: Welcome to the 'Language Translator'. |
| 2 | @ API-bot is here to help you. |
| 3 | What would you like to do? To begin name an action or resource. |
| 4 | H: help me please |
| 5 | C: You may work with the following resources and actions: |
| 6 | identifiable_languages |
| 7 | identify |
| 8 | models |
| 9 | models model_id |
| 10 | translate |
| 11 | What would you like to do? To begin name an action or resource. |
| 12 | H: identify please |
| 13 | C: You chose: identify. What operation would you like to perform? |
| 14 | H: I have no idea, please help |
| 15 | C: Available operations are: |
| 16 | (GET) Identifies the language of the input text, |
| 17 | (POST) Identifies the language of the input text |
| 18 | H: get then |
| 19 | C: What is the value of the parameter text? |
| 20 | H: La vie est belle |
| 21 | C: identify text 'La vie est belle' |
| 22 | OK, call now? |
| 23 | H: yes |
| 24 | C: OK, making call now. |
| 25 | identify text 'La vie est belle' accept 'text/plain' |
| 26 | "fr" |

Table 2 shows a transcript of a dialogue between the generated API-bot conversational agent ("C") and a human end user ("H") for calling the Translator web API. The compiler in one embodiment generates the chat bot directly from the Swagger specification shown in Table 1. On Line 4, the end user asks for help; note that rather than having to learn a computer language to know how to ask for help, they can use natural language. API-bot is configured to understand the help intent via a machine learning classifier trained from examples; Lines 14 shows a different utterance that also gets classified into the help intent. Lines 5-11 show help text generated from the Swagger paths. On Line 12, the end user picks the action "identify". Subsequently, the chat bot collects additional information it needs to call "identify". After the human has provided the operation (get) and the text parameter (La vie est belle), the chat bot calls the web API and displays the result ("fr" for French). Along the way, the bot also displays the action and its parameters concisely using back-quotes. This has two effects. First, confirmation to establish common ground with the user; and second, educating the user how to make this call more easily.

The following description shows how an API-bot is generated in one embodiment and how it works in one embodiment.

Figure 2:
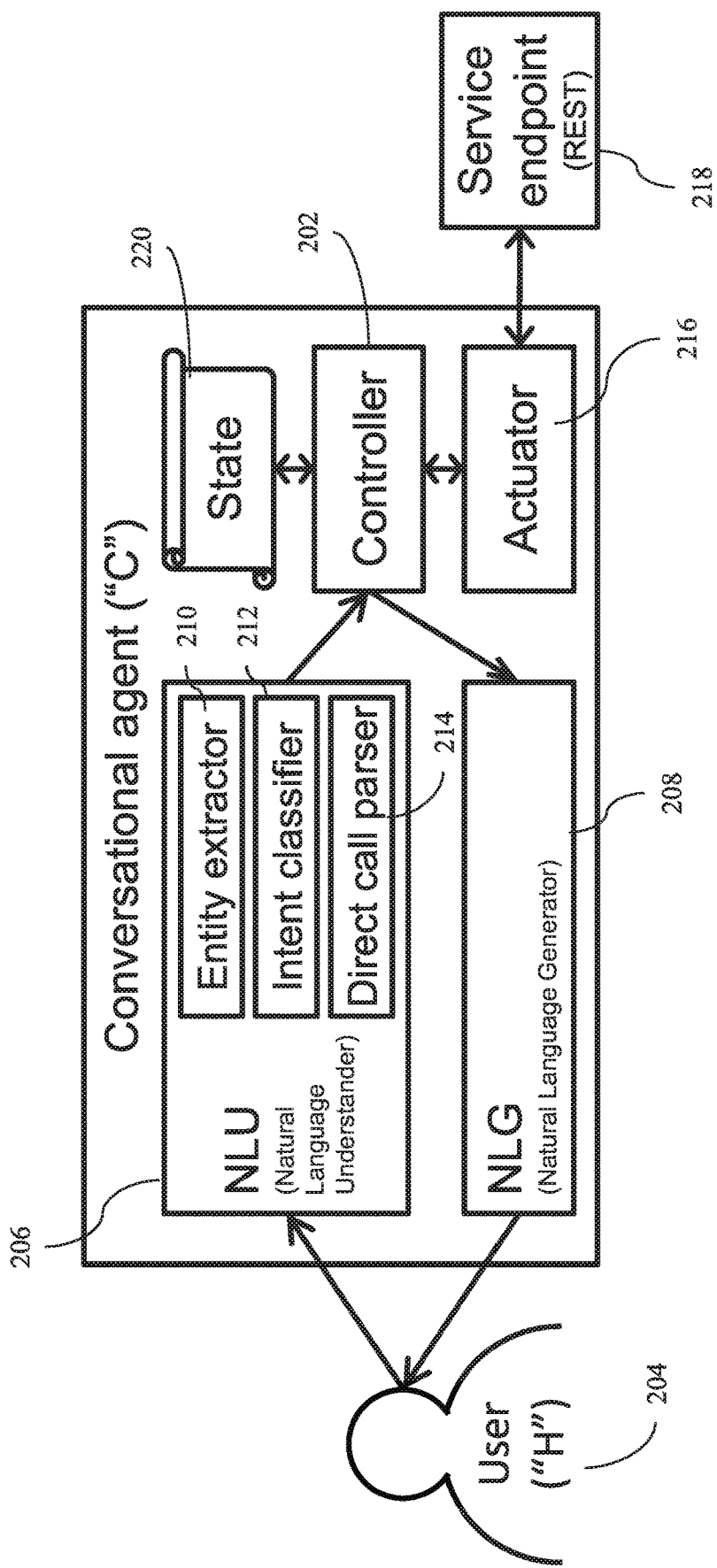
FIG. 2 shows runtime architecture of a bot in one embodiment.

A generated API-bot conversational agent enables the end user to call a web API. FIG. 2 shows a runtime architecture in one embodiment. One or more hardware processors may execute or run the components. A dialogue controller 202 guides the conversation for calling web APIs. The controller 202 receives inputs from the user 204 via an NLU (natural language understander) component 206, and sends outputs to the user 204 via an NLG (natural language generator) component 208. In one embodiment, API-bot agents are built on the Watson Conversation Service (WCS) platform for conversational agents. API chat bots of the present disclosure may be built on another conversation service platform.

In WCS, NLU includes an entity extractor 210 and an intent classifier 212, which an API-bot customizes for the Swagger at hand. In addition, an API-bot adds a direct call parser 214 as another NLU component not usually found in WCS or other platforms. In WCS, the controller 202 can be driven from an FSM (finite-state machine) 220 dialogue specification. In one embodiment, the output of the controller 202 includes natural-language prompts for the human and HTTP calls to service endpoints. Embodiments of the NLU component 206, the mapping from API specification (e.g., Swagger) to the controller FSM 202, additional state that the controller maintains 220, the NLG 208 and actuator 216 components that implement the outputs are described in more detail below.

Input NLU

The following describes the NLU component 206 in one embodiment in further detail. The NLU component 206 turns natural-language utterances from the user 204 into symbols for the dialogue controller 202. Most modern chat bot platforms recognize two kinds of symbols: entities and intents.

An entity represents a term or object in a user utterance, and WCS marks entities with the @-sigil. For example, in Table 2, Line 18, the word get belongs to the @get entity. The entity extractor 210 in the NLU 206 may return multiple entities for a single user utterance, one for each matching term it found. The entity extractor 210 is implemented by a pattern matching engine in one embodiment. There are some entities common to all API-bot agents independently of the concrete API (e.g., Swagger) specification at hand, for instance, @get and @post. In addition, there are entities generated from parameters found in the API (e.g., Swagger) specification, for instance, @text, @source, and @target.

An intent represents a purpose or goal, something a user wants to do, and WCS marks intents with the #-sigil. For example, in Table 2, Line 4, 'help me please' belongs to the #help intent. The intent classifier 212 in the NLU 206 returns the intent with the highest confidence for a given utterance, or a special #irrelevant intent if nothing has high confidence. The intent classifier 212 is implemented with supervised machine learning, where the training data includes <example, intent> pairs. The intent classifier 212 works best when there are many examples for each intent, examples for different intents are not similar, and the examples are representative of actual user utterances. For instance, training examples for the #help intent might include 'help', 'What are the options?', 'What can I do', and 'what is possible'. There are some intents common to all API-bot agents independently of the concrete API (e.g., Swagger) specification at hand, for instance, #help, #yes, and #no. In addition, there are intents generated from paths found in the API (e.g., Swagger) specification, for instance, #identify and #translate.

While the basic NLU functionality of entities and intents suffices for many chat bots, it may be too limiting for obtaining good conversations for calling a web API. One problem is that some parameters have free-flow values that cannot be easily matched or classified against a pre-defined entity or intent. Furthermore, some inputs should be hidden from the entity extractor and the intent classifier altogether. For example, the text parameter to the identify action can contain arbitrary words that should not trigger their own entities or intent. Therefore, when API-bot prompts for such a parameter, it treats the entire next human utterance as one value, as shown in Table 2, Line 20.

While this solves the problem, unfortunately, requiring a separate turn for each piece of information leads to a prolonged dialogue. Therefore, the present disclosure introduces a quoting feature. In one embodiment, the quoting feature is represented by backquotes (' . . . '), because they are familiar to users of a messaging platform for rendering verbatim text. API-bots can be deployed on a messaging platform such as the Slack, and also use quotes to signal verbatim text. In addition, the present disclosure introduces a convention by which a parameter name entity in the utterance followed by quoted text sets the parameter to the quoted value. This convention makes it possible to render an API call in a single utterance, and is implemented by the direct call parser 214. For example, 'identify the text 'La vie est belle'' calls the identify action, setting the text to 'La vie est belle', and defaults to using the HTTP GET method.

Controller and State

Figure 3:
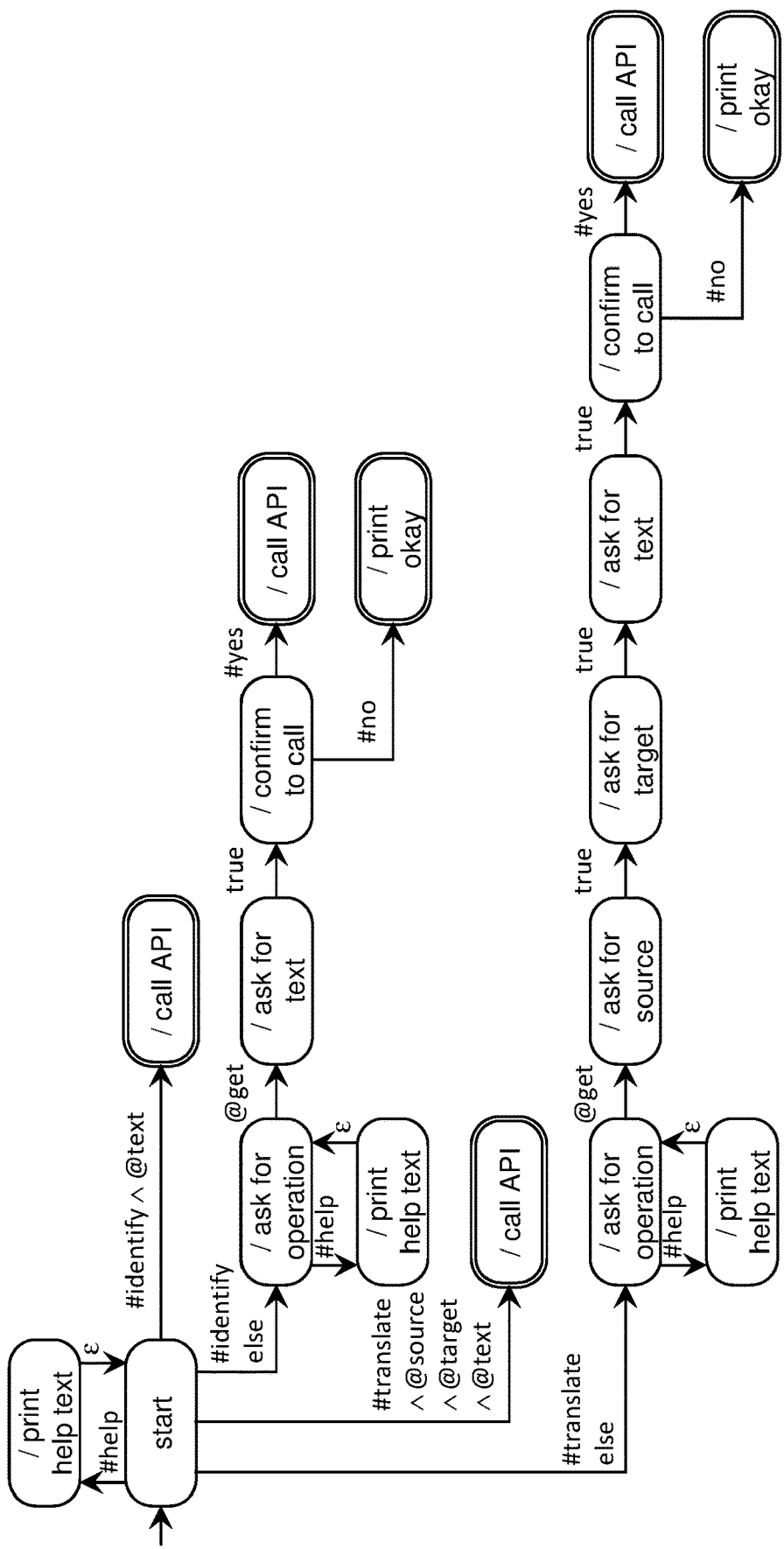
FIG. 3 illustrates in one embodiment an excerpt of a finite state machine that a bot compiler generates from an example translator application programming interface.
Figure 4A:
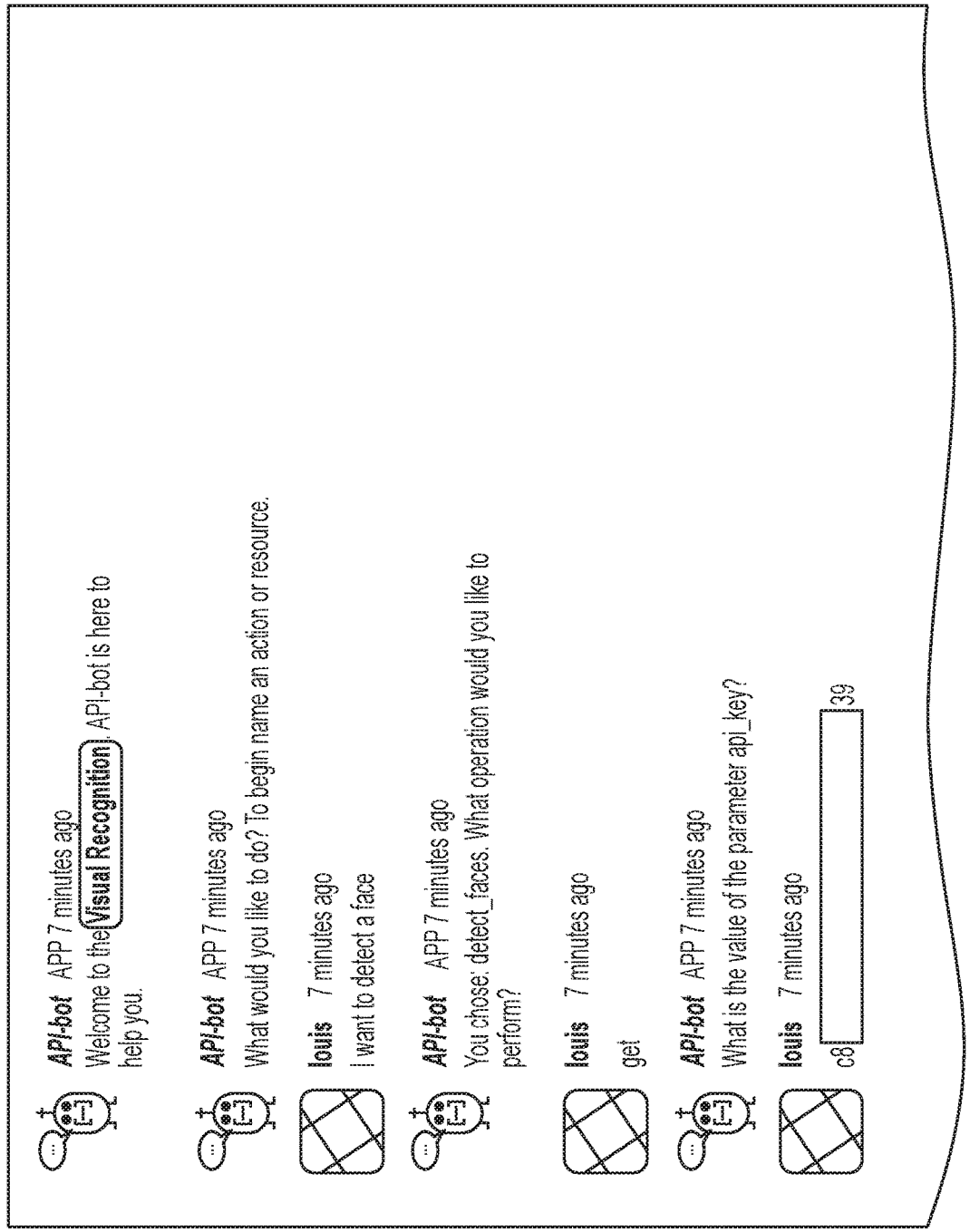
Figure 4B:
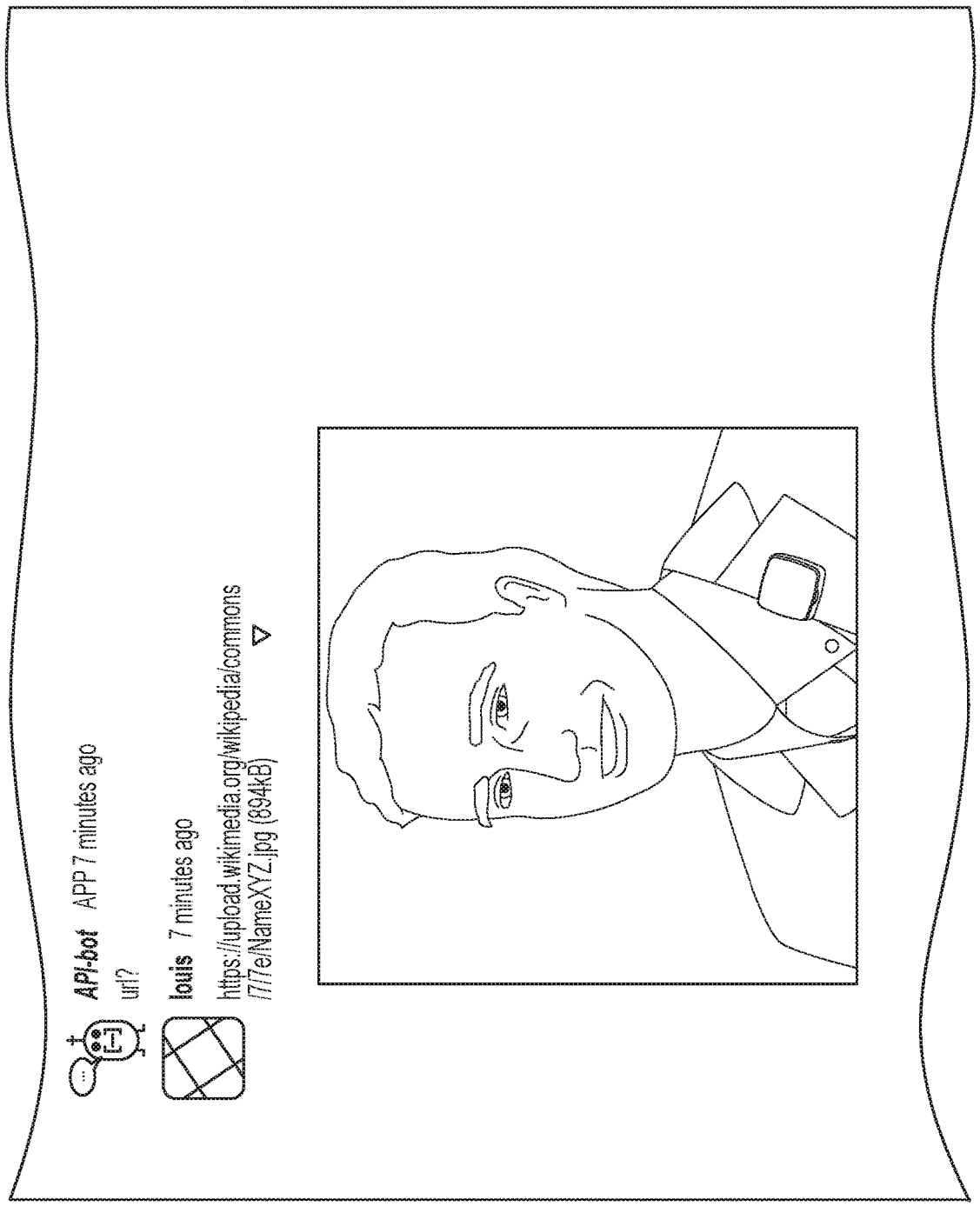

The following describes in one embodiment the mapping from an API specification (e.g., Swagger) to the controller finite state machine (FSM) 202, and on additional state that the controller maintains 220. The controller component 202 in FIG. 2 maintains state and turns symbols from the NLU 206 into instructions to the NLG 208 and the actuator 216. A low-level formalism for specifying dialogue flow in chat bots is FSMs. The WCS programming model supports FSMs, among other features. An implementation of the API-bot compiler in one embodiment uses FSMs as its code-generation target (the source being an API specification (e.g., Swagger)). FIG. 3 illustrates in one embodiment an excerpt of the FSM that the API-bot compiler generates from the Translator API (e.g., in Swagger) shown in Table 1. The following text first explains the notation and then discusses the dialogue flow it specifies.

Each rounded rectangle in FIG. 3 represents a state. There is one special start state marked with an incoming arrow that does not originate from any other state. There are several final states, marked with double borders. There is an implicit top-level loop from final states back to the start state. Directed edges between states are transitions and their labels are predicates. State labels have the form stateName/action, but most state names are omitted for brevity. Since actions reside on states, not on transitions, the FSM in one embodiment is a Moore machine (e.g., not a Mealy machine). In one embodiment of an implementation, Moore machines are implemented as the formalism because the WCS programming model supports Moore machines. Other state machine implementations may be employed.

Transition predicates are based on symbols from the NLU, in other words, entities and intents, marked with @ and #, respectively. Some transitions are marked with the empty-word symbol ε or epsilon, indicating that the chat bot does not wait for user input before taking the transition. Finally, some transitions are marked with the true predicate, indicating that the chat bot collects a user input, but treats the entire utterance as one value, without making the transition depend on what that value was. Actions in FSM states are instructions to the NLG and the actuator. For instance, the print help text action is an instruction to the NLG, and the call API action is an instruction to the actuator. For brevity, FIG. 3 does not spell out the details of the actions, but they are context specific. The context for help text is the current FSM state, and context for an API call includes the current FSM state as well as the operation and parameters collected in states leading up to it.

The dialogue flow in FIG. 3 shows five transitions from the start state.

Transition 1: From start, if #help, the bot prints the list of known resources and actions, generated from the paths in Swagger. API-bot implements a heuristic to elide common path prefixes "/v2/" in the Translator Swagger because they provide no useful information and cause unnecessary confusion to end users. After displaying the help text, the chat bot returns to the start state without collecting a user input, indicated by the ε (e.g., epsilon)-transition.

Transition 2: From start, if #identify ^ @text, the direct call parser has provided all the necessary information to call the "/v2/identify" path with the required text parameter. If no HTTP method is specified, the method defaults to GET if the path supports that. API-bot implements a heuristic to not ask for optional parameters that have a default value, such as the accept parameter in this case. Furthermore, the accept parameter implements content negotiation, a feature general to REST and not specific to the Translator API. Content negotiation is an implementation technicality better hidden from the non-technical end user.

Transition 3: From start, if #identify but the previous transition did not fire, the chat bot has a chain of nodes collecting the operation and the parameters for calling the "/v2/identify" path. In this context, the help text lists operations for the given path. FIG. 3 only shows the FSM states for @get, eliding those for @post. This part of the FSM also contains an example of a true condition, because the text parameter can be any string and should thus not be subjected to NLU.

Transition 4: From start, if #translate ^ @source ^ @target ^ @text, the direct call parser has provided all the necessary information to call the "/v2/translate" path.

Transition 5: From start, if #translate but the previous transition did not fire, the chat bot has a chain of nodes collecting the operation and the parameters for calling the "/v2/translate" path.

The state 220 in FIG. 2 includes the FSM state as well as partial information collected by the current part of the dialogue flow that drives towards the goal of making an API call.

Output: NLG and Actuator

The following describes in one embodiment the NLG 208 and actuator 216 components that implement the outputs. The NLG 208 and actuator 216 components in FIG. 2 turn instructions from the dialogue controller 202 into natural-language responses to the user 204 and HTTP calls to the REST service endpoint 218. To encapsulate the controller 202 with a clean interface, an implementation of API-bot in one embodiment reifies these instructions as JavaScript Object Notation (JSON) objects.

API-bot in one embodiment uses a simple NLG. For the most part, the API-bot NLG 208 includes literal hard-coded strings, some of which are generated from the API specification (e.g., Swagger) at compile time, for example, the list of paths in Table 2, Lines 6-10. In some cases, the NLG 208 also uses string interpolation at runtime, where string interpolation means inserting a dynamically computed substring into a constant string template at runtime.

The actuator 216 is in charge of making the HTTP calls to the web API. An example implementation of API-bot in one embodiment is written in JAVA and uses a simple HTTP client to execute a synchronous call to the service endpoint 218. In one embodiment, the actuator 216 is deployed as a local application on the end user's device. In one embodiment, the NLU 206 and most of the controller 202 are deployed as a cloud-hosted application in the Watson Conversation Service or like service. In another embodiment, the actuator 216 may be hosted on a public cloud or on the computer infrastructure of the organization offering the service endpoint.

The actuator 216 in one embodiment is also in charge of filling in default values for missing parameters, when possible. This comes in two flavors in one embodiment: (i) default values can be specified in the original API specification (e.g., Swagger) file, and (ii) the present disclosure allows API-bot annotations in the API specification (e.g., Swagger) file indicating a callback to other parts of the web API that may be used to fill in that default value.

TABLE 3

"x-API-bot-callback": {
  "params": [
    { "value": "text",
      "in": "query",
      "name": "text" }
  ],
  "prefix_length": 0,
  "method": "GET",
  "path": "/v2/identify",
  "base": "/language-translator/api"
} ...

Table 3 shows the corresponding annotations for the source language parameter of the translate call in the Language Translator web API. It indicates that if the source parameter is not provided by the user, a default can be obtained by calling identify with the input text. The value of the appropriate parameter is obtained from the current context if it is present. The callback description is read along with the rest of the API specification (e.g., Swagger) file and passed through the controller to the actuator 216. It contains all the information necessary to make a sub-call to another part of the API and how to fill in the parameters for that sub-call (in this example, only the text parameter is required). The above described a compilation from an API specification to a dialogue specification.

Table 4 shows Swagger for Tone Analyzer web API.

TABLE 4

| Tone Analyzer web API |
| --- |
| 1    {swagger: "2.0", |
| 2    basePath: "/tone-analyzer/api", |

TABLE 4-continued

Tone Analyzer web API

| | |
|---|---|
| 3 | info: { |
| 4 | version: "3.0.0", title: "Tone Analyzer API", |
| 5 | description: "Detect three types of tones from written text: |
| 6 | emotions, social tendencies, and style. ..." }, |
| 7 | paths: { |
| 8 | "/v3/tone": { |
| 9 | get: { |
| 10 | summary: "GET Analyze tone", |
| 11 | description: "Analyzes the tone of a piece of text.", |
| 12 | parameters: [ |
| 13 | { name: "version", in: "query", required: true, |
| 14 | type: "string", default: "2016-05-19", |
| 15 | description: "a date that identifies the API version" }, |
| 16 | { name: "text", in: "query", required: true, |
| 17 | type: "string", |
| 18 | description: "Content to be analyzed." }, |
| 19 | { name: "tones", in: "query", required: false, |
| 20 | type: "string", |
| 21 | description: "Filter the results by a specific tone." }, |
| 22 | { name: "sentences", in: "query", required: false, |
| 23 | type: "boolean", |
| 24 | description: "Filter your response to remove the |
| 25 | sentence level analysis." }], |
| 26 | responses: { |
| 27 | 200: { |
| 28 | description: "successful operation", |
| 29 | schema: { "$ref": "#/definitions/ToneAnalysis" }}, |
| 30 | 400: ... }}, |
| 31 | post: ... }}, |
| 32 | definitions: { |
| 33 | ToneAnalysis: { |
| 34 | description: "The results of performing tone analysis.", |
| 35 | required: [ "document_tone" ], |
| 36 | properties: { |
| 37 | document_tone: { |
| 38 | type: "array", description: ..., |
| 39 | items: { "$ref": "#/definitions/ElementTone" }}, |
| 40 | sentences_tone: { |
| 41 | type: "array", description: ..., |
| 42 | items: { "$ref": "#/definitions/SentenceAnalysis" }}}}, |
| 43 | ElementTone: ..., |
| 44 | ... }} |

Table 5 shows an example dialogue with Tone Analyzer web API.

TABLE 5

A dialogue with Tone Analyzer web API

| | |
|---|---|
| 1 | C: What would you like to do? To begin name an action or resource. |
| 2 | H: What's the tone of the text 'I am very happy'? |
| 3 | C: Calling now. |
| 4 | tone text 'I am very happy' version '2016-05-19' |
| 5 | [ { "score": 1.0, |
| 6 | "tone_id": "joy", |
| 7 | "tone_name": "Joy" }, |
| 8 | { "score": 0.97759, |
| 9 | "tone_id": "confident", |
| 10 | "tone_name": "Confident" }, |
| 11 | { "score": 0.61522, |
| 12 | "tone_id": "agreeableness_big5", |
| 13 | "tone_name": "Agreeableness" } ] |

Table 6 shows Swagger for Visual Recognition web API.

TABLE 6

Visual Recognition web API

| | |
|---|---|
| 1 | {swagger: "2.0", |
| 2 | info: { |
| 3 | title: "Visual Recognition", version: "3.0", |
| 4 | description: "Uses deep learning algorithms to identify scenes, objects, and faces." }, |
| 5 | basePath: "/visual-recognition/api", |
| 6 | paths: { |
| 7 | "/v3/detect_faces": { |
| 8 | get: { |
| 9 | summary: "Detect faces in an image", |
| 10 | parameters: [ |
| 11 | { "$ref": "#/parameters/ApiKeyParam" }, |
| 12 | { "$ref": "#/parameters/SingleURLParam" }, |
| 13 | { "$ref": "#/parameters/DateVersionParam" }], |
| 14 | responses: { |
| 15 | 200: { |
| 16 | description: "success", |
| 17 | schema: { "$ref": "#/definitions/Faces" }}, |
| 18 | 400: { |
| 19 | description: "Invalid request", |
| 20 | schema: { "$ref": "#/definitions/ErrorTopLevel" }}}}, |
| 21 | post: ... }, |
| 22 | ... }, |
| 23 | parameters: { |
| 24 | ApiKeyParam: { |
| 25 | name: "api_key", in: "query", required: false, type: "string", |
| 26 | description: "API Key used to authenticate." }, |
| 27 | SingleURLParam: { |
| 28 | name: "url", in: "query", required: true, type: "string", |
| 29 | description: "URL of an image (.jpg, .png). Redirects are followed, so you |
| 30 | can use shortened URLs. The resolved URL is returned in the |
| 31 | response. Maximum image size is 2 MB." }, |
| 32 | DateVersionParam: { |
| 33 | name: "version", in: "query", required: false, type: "string", |
| 34 | default: "2016-05-20", pattern: "^\\d{4}-\\d{2}-\\d{2}$", |
| 35 | description: "The release date of the version of the API you want to use. |
| 36 | Specify dates in YYYY-MM-DD format." }, |
| 37 | ... }, |

TABLE 6-continued

Visual Recognition web API

```
38  definitions: {
39    Faces: {
40      type: "object",
41      required: [ "images_processed", "images", "warnings" ],
42      properties: {
43        images_processed: { "$ref": "#/definitions/ImagesProcessedOutParam" },
44        images: {
45          type: "array",
46          items: { "$ref": "#/definitions/FacesTopLevelSingle" } },
47        warnings: {
48          type: "array",
49          description: "Omitted if there are no warnings.",
50          items: { "$ref": "#/definitions/WarningInfo" }}}},
51  ...}}
```

FIGS. 4A-4D show an example dialogue with Visual Recognition web API shown in Table 6.

Tables 4-6 and FIGS. 4A-4D illustrate example case studies for web APIs additional to the Translator API examples described above, demonstrating that the API bot of the present disclosure works for more than just one particular API. The API bot of the present disclosure in one embodiment may also be integrated with a messaging platform such as the Slack messaging platform, a real-time messaging system.

The Tone Analyzer analyzes text documents to detect three things: emotions (e.g., anger, joy, sadness), style (e.g., confidence, tentativeness), and social tendencies (e.g., extraversion, agreeableness). Table 4 shows an excerpt of the web API specification. It offers only a single path, "/v3/tone", with four parameters, version, text, tones, and sentences. Three of the four parameters are either optional or have a default value, leaving only the text parameter as mandatory information to be specified for each call. Table 5 shows the transcript of an API-bot dialogue for calling the Tone Analyzer. The human simply makes a direct call, setting the text to 'I am very happy'. The result of the call matches what one would expect given the input text. The analyzer determined that the dominant emotion is joy, the style is confident, and the strongest social tendency found in this text is agreeableness.

The Visual Recognition API shown in Table 6 analyzes image files to identify three things: scenes, objects, and faces. Table 6 shows an excerpt of the web API specification. The excerpts from the web API specification hones in on only one of the paths, "/v3/detect/faces". In one embodiment, the parameters are declared by reference instead of inline, because other paths share some of the same parameters. There are three parameters: api_key (a hard-to-guess string of digits and numbers used to authenticate); url (an address of an image file); and version (an API version given as a string). The version has a default value.

FIGS. 4A-4D show the transcript of an API-bot dialogue for calling the Visual Recognition API. It is a screenshot of API-bot running integrated into the Slack messaging platform. Slack is often used for persistent multi-party chat by collaborating teams. In this case, there are two participants, API-bot and a human end user called louis. The dialogue showcases a step-by-step call, where the end user asks for help and the chat bot prompts for parameters one by one. The end user copy-and-pastes the API key, which they obtained separately. One Slack feature is that when a user pastes a Uniform Resource Locator (URL), it displays a preview of its destination. In this case, the URL is a picture of a historical personality, and Slack shows an excerpt of the surrounding Wikipedia article. API-bot does not prompt for the version parameter, because the Swagger specifies a default for it. The version parameter may be set explicitly via a direct call.

Before making the call, API-bot in one embodiment echoes the concise version for grounding and teaching. This illustrates how backquotes are rendered in Slack markdown. In one embodiment, the quoted text shows up in a typewriter font with a different color scheme than normal text. In the end, API-bot makes the call, and the Visual Recognition API reports back its guess for the age, gender, and identity of the historical personality. These guesses are accurate.

Besides the formatting advantages, there are other good reasons for integrating bots that call web APIs into Slack or a similar messaging platform. Since users at a company may often chat with each other via Slack, putting the chat bot there reduces the need to context-switch. In the calling case, it provides a persistent record of what happened for accountability. It is also an easy way to keep each other informed, for instance, when the web API returns a kind of status report. Also, it increases the learning opportunities, where one user's successful calls are there for other users to emulate.

As described, different API-bot chat bots may be generated from different API specifications. A chat hot in the present disclosure that is generated from an API specification enables a conversation to drive an action, e.g., a web API call. A chat bot of the present disclosure in one embodiment may be completely self-documenting. For instance, the user can learn everything they need to know about the chat bot, including how to make direct calls, by interacting with it.

VoiceXML is a standard that was designed to play the same role for conversations that HTML plays for visual content. The vision was that there would be a conversational web, where providers serve up VoiceXML; consumers interact with VoiceXML via voice browsers; and VoiceXML can be hyper-linked. A draw-back of VoiceXML is that it requires providers to write new chat bots in that language. In contrast, API-bot of the present disclosure in one embodiment uses pre-written API specifications such as Swagger to boot-strap a chat bot.

Swagger is designed as a source language from which to generate assorted different artifacts. Swagger user interface (UI) visually renders documentation, and lets developers interact with a web API in a sandbox. However, that interaction differs from API-bot in that it does not use natural-language conversation, does not target end users, and is not intended for production use.

Natural language interfaces to databases (NLIDB) may generate NLIDB agents from database schemas. NLIDB work that employs multi-turn conversation has only emerged recently and is still an active research area.

If this then that (IFTTT) enables end users to call web APIs in a simple and convenient way. Participants in the IFTTT ecosystem must wrap their end-points into either triggers or actions. Once those are created, the end user can put them together into recipes. In contrast, with API-bot, participants need not wrap their end-points in actions; instead, the actions are compiled into the chat bot by using an API specification as the source language. Also, unlike API-bot, IFTTT does not offer a natural-language chat interface.

Programming with Natural Language

While works related to natural language programming may include generally transforming natural language sentences to formal languages, they do not generate chat bots from API specification or web API specifications, or a chat bot so generated that is self-documenting.

The system, method and technique in one embodiment presents a compiler from web API specifications (e.g., written in Swagger) to chat bots for calling those web APIs. In one aspect, the compiler allows an enterprise that has an API (e.g., Swagger) specification for the services it offers its customers or employees to immediately obtain an initial natural-language chat bot for them. Doing so enables the company to improve the chat bot, which tends to be a continuous feedback-driven process. The generated bot is self-documenting, so for example, that users who do not know how to use the bot or the web API can find out how to do that by interacting with the bot. The compiler, for example, can render sophisticated APIs easy to call via chat bots.

Figure 5:
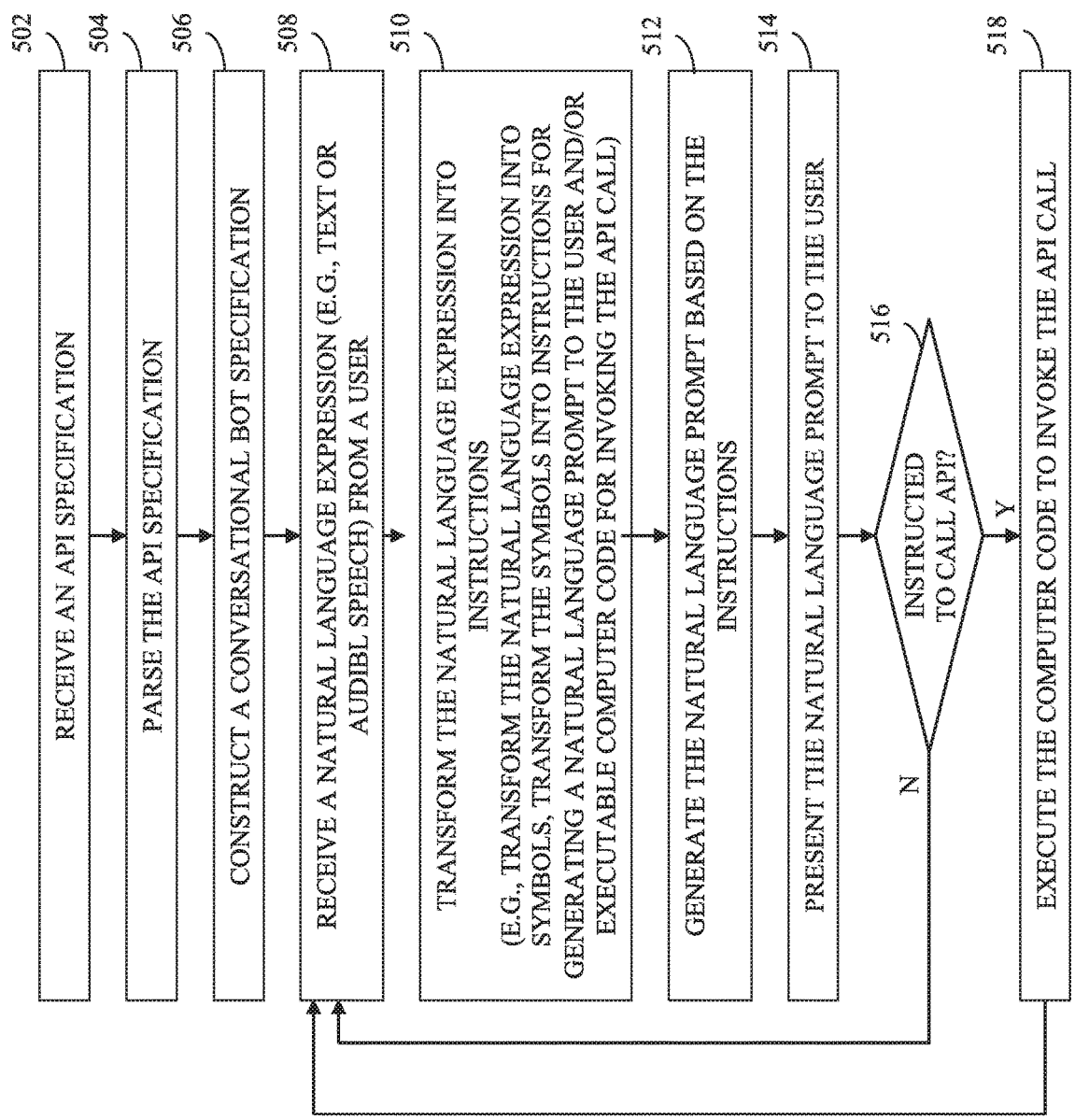
FIG. 5 is a diagram illustrating a method of automatically generating a conversational bot for an application programming interface (API) in one embodiment.

FIG. 5 is a diagram illustrating a method of automatically generating a conversational bot for an application programming interface (API) in one embodiment. The method is executed by one or more hardware processors, for examples, as described with reference to the components shown in FIG. 2. At 502, an API specification is received that includes information associated with invoking an API call. An example of such API specification is Swagger specification. At 504, the API specification is parsed. At 506, based on parsing the API specification, a conversational bot specification is constructed. For instance, a finite state machine may be constructed. The finite state machine includes a plurality of states and state transitions, and specifies a dialogue flow for the conversational bot. An example of a finite state machine is shown in FIG. 3. Referring to FIG. 5, at 508, a natural language expression such as a text expression or an utterance or audible speech is received from a user.

At 510, the natural language expression is transformed into instructions. For instance, the natural language expression is transformed into symbols, and the symbols are transformed into instructions for generating a natural language prompt to the user and/or executable computer code for invoking the API call. In one embodiment, the symbols may be transformed into instructions based on a finite state machine that is constructed, for example, as part of the conversational bot specification. In one embodiment, the symbols are transformed into instructions by being used to trigger a state transition, and using the action of the target state as instructions.

At 512, the natural language prompt or response is generated based on the instructions. The natural language prompt or response is generated, for instance, responsive to the instructions containing a prompt to be presented to a user, for example, for asking for confirmation or a question. An instruction may include or specify a string that literally contains the natural-language prompt to be displayed or uttered. In another embodiment, string interpolation may be performed to generate the natural language prompt.

At 514, the natural language prompt or response is presented, for example, displayed and/or uttered to the user, for example, as text or uttered by a voice synthesizer or like device coupled to the one or more hardware processors, for instance, responsive to generating the natural language prompt at 512.

At 516, it is determined whether the instructions contain a call to an API. At 518, if the instructions instruct to call the API, a computer code to invoke the API call is executed. The computer code may be generated, for instance, based on the instructions that contain a call to an API. The logic of method may return to 508 and iterate the processing, for example, according to the dialog flow specified in the conversational bot specification. If at 516, the instructions do not contain a call to an API, the processing may return to 508 and repeat the processing at 508-516, for example, based on the conversational bot specification, e.g., including a finite state machine, to carry on the dialogue flow for invoking the API call.

An example of the computer code to invoke the API call includes a hypertext transfer protocol (HTTP) call to a service endpoint providing a service associated with the API call. As an example, the API specification may be a web API specification and the API call may include a Representational State Transfer call.

In one embodiment, as described above with reference to the NLU component, the symbols may include at least entities representing objects in the natural language utterance and intent representing a purpose in the natural language utterance. In one aspect, the dialogue flow may include invoking multiple API calls, wherein the multiple API calls are invoked in a single dialogue.

The compiler in another embodiment may include authentication features. In addition, the compiler may allow results from one API call to feed into another. For instance, the list of identifiable languages helps determine allowable values for the source and target language in a translation. Thus, multiple calls may be strung together. Still yet, bots may be generated from a collection of API specifications.

Figure 6:
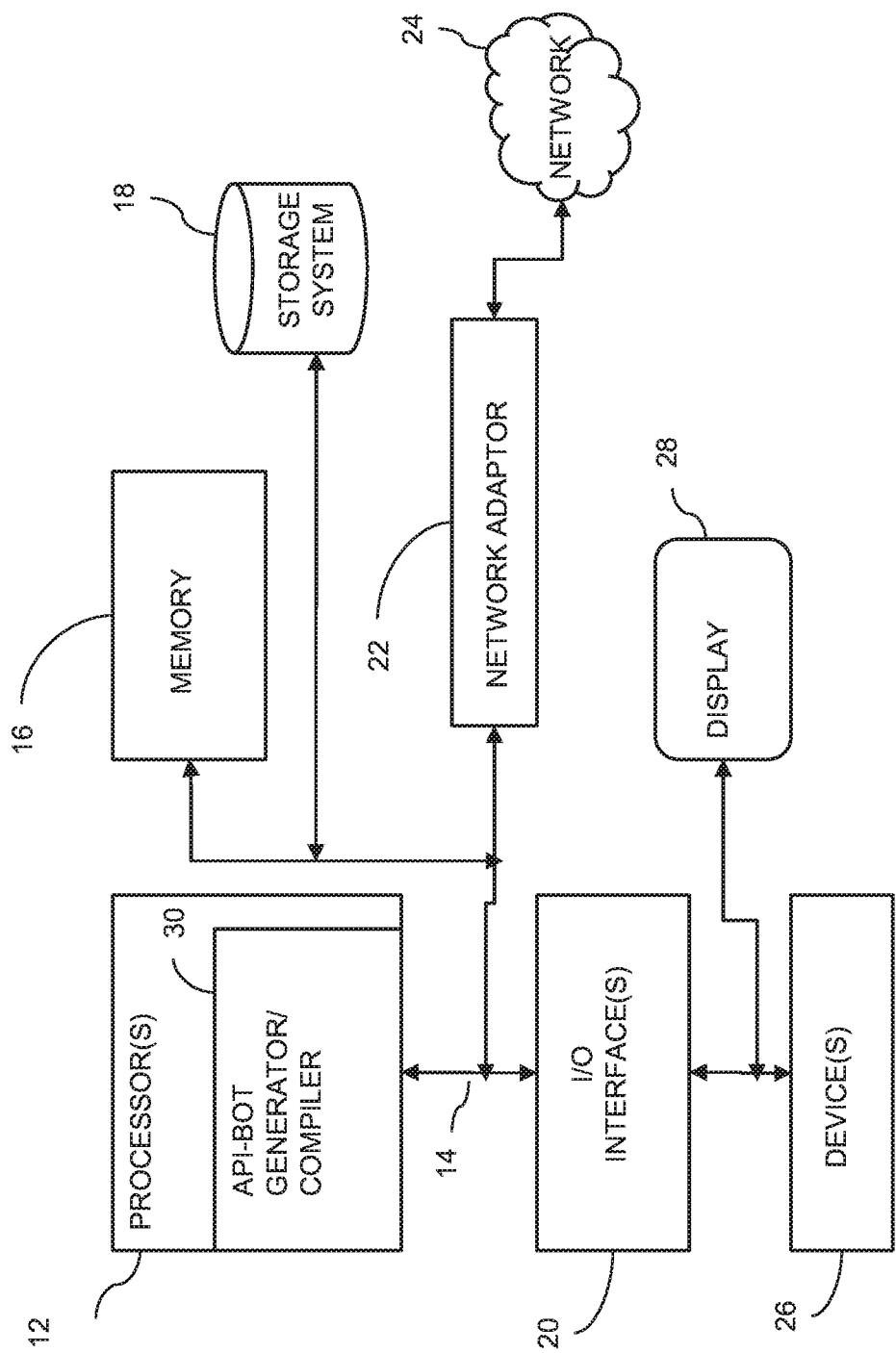
FIG. 6 illustrates a schematic of an example computer or processing system that may implement a chat bot generator/compiler system in one embodiment of the present disclosure.

FIG. 6 illustrates a schematic of an example computer or processing system that may implement a chat bot generation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of automatically generating a conversational bot for an application programming interface (API), comprising:
   receiving an API specification associated with an API, the API specification specifying at least information associated with invoking an API call;
   based on parsing the API specification, generating dynamically a dialog flow for a conversational bot to carry out with a user in natural language to conduct a natural language dialog with a user for facilitating a use of the API, wherein the conversational bot's dialog flow that is dynamically created can be different based on receiving a different API specification; and
   based on a dialog carried out with the user in natural language and the API specification, causing the conversational bot to invoke the API.

2. The method of claim 1, wherein the invoking the API includes at least executing a hypertext transfer protocol (HTTP) call to a service endpoint providing a service associated with the API.

3. The method of claim 1, wherein the API specification includes at least a web API specification.

4. The method of claim 1, wherein the method further including at least allowing the conversation bot to carry out the dialog flow with the user.

5. The method of claim 1, further comprising constructing a conversational bot specification based on the API specification.

6. The method of claim 5, wherein the constructing the conversational bot specification includes at least constructing a finite state machine (FSM) including at least a plurality of states and state transitions, the finite state machine specifying the dialogue flow for the conversational bot.

7. The method of claim 5, wherein the conversational bot specification includes at least invoking multiple API calls, wherein the multiple API calls are invoked in a single dialogue.

8. A computer program product comprising a computer readable storage medium having program instructions embodied therewith, the program instructions executable by a device to cause the device to:

receive an API specification associated with an API, the API specification specifying at least information associated with invoking an API call;

based on parsing the API specification, generate dynamically a dialog flow for a conversational bot to carry out with a user in natural language to conduct a natural language dialog with a user for facilitating a use of the API, wherein the conversational bot's dialog flow that is dynamically created can be different based on receiving a different API specification; and based on a dialog carried out with the user in natural language and the API specification, cause the conversational bot to invoke the API.

9. The computer program product of claim 8, wherein the conversational bot is caused to invoke the API by at least executing a hypertext transfer protocol (HTTP) call to a service endpoint providing a service associated with the API.

10. The computer program product of claim 8, wherein the API specification includes at least a web API specification.

11. The computer program product of claim 8, wherein the device is further caused to construct a conversational bot specification based on the API specification.

12. The computer program product of claim 11, wherein constructing the conversational bot specification includes at least constructing a finite state machine (FSM) including at least a plurality of states and state transitions, the finite state machine specifying the dialogue flow for the conversational bot.

13. The computer program product of claim 11, wherein the conversational bot specification includes at least invoking multiple API calls, wherein the multiple API calls are invoked in a single dialogue.

14. A system comprising:
a hardware processor;
a memory device operably coupled to the hardware processor;
the hardware processor operable to at least:
receive an API specification associated with an API, the API specification specifying at least information associated with invoking an API call;

based on parsing the API specification, generate dynamically a dialog flow for a conversational bot to carry out with a user in natural language to conduct a natural language dialog with a user for facilitating a use of the API, wherein the conversational bot's dialog flow that is dynamically created can be different based on receiving a different API specification; and based on a dialog carried out with the user in natural language and the API specification, cause the conversational bot to invoke the API.

15. The system of claim 14, wherein the conversational bot is caused to invoke the API by at least executing a hypertext transfer protocol (HTTP) call to a service endpoint providing a service associated with the API.

16. The system of claim 14, wherein the API specification includes at least a web API specification.

17. The system of claim 14, wherein the hardware processor is further operable to construct a conversational bot specification based on the API specification.

18. The system of claim 17, wherein the hardware processor is operable to construct the conversational bot specification at least by constructing a finite state machine (FSM) including at least a plurality of states and state transitions, the finite state machine specifying the dialogue flow for the conversational bot.

19. The system of claim 14, wherein the conversational bot specification includes at least invoking multiple API calls, wherein the multiple API calls are invoked in a single dialogue.

* * * * *